US006636776B1

(12) United States Patent
Barton et al.

(10) Patent No.: US 6,636,776 B1
(45) Date of Patent: Oct. 21, 2003

(54) SYSTEM AND METHOD FOR MANAGING WELDING PROCEDURES AND WELDING RESOURCES

(75) Inventors: David J. Barton, Twinsburg, OH (US); Theresa M. Spear, Highland Heights, OH (US); George Daryl Blankenship, Chardon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 183 days.

(21) Appl. No.: 09/900,987

(22) Filed: Jul. 9, 2001

(51) Int. Cl.⁷ .......................... G06F 19/00; B23K 11/24
(52) U.S. Cl. ........................ 700/169; 219/109; 219/132
(58) Field of Search ................................. 700/180, 169, 700/212; 219/110, 130.5, 131, 132, 136

(56) References Cited

U.S. PATENT DOCUMENTS

| 5,808,885 A | | 9/1998 | Dew et al. | |
|---|---|---|---|---|
| 5,850,066 A | * | 12/1998 | Dew et al. | 219/109 |
| 5,859,847 A | * | 1/1999 | Dew et al. | 707/104.1 |
| 6,002,104 A | * | 12/1999 | Hsu | 219/130.5 |
| 6,018,729 A | * | 1/2000 | Zacharia et al. | 706/21 |
| 6,040,555 A | * | 3/2000 | Tiller et al. | 219/132 |

* cited by examiner

*Primary Examiner*—Leo Picard
*Assistant Examiner*—W. Russell Swindell
(74) *Attorney, Agent, or Firm*—Amin & Turocy, LLP

(57) ABSTRACT

A system and method for managing welding procedures is provided. The invention includes a welding system, a local server and/or a remote system. The invention further provides for searching of the welding system, local server and/or remote system for potentially suitable welding procedure(s). The invention further provides for dynamic creation of welding procedure(s) based upon user input, information stored on the welding system, a local area network and/or a remote system. The invention also includes filtering of the search results based at least in part upon commonality of consumables. The invention further includes calculation of weld costs for potentially suitable welding procedure(s). The invention further provides for communication with an inventory & distribution system and/or ordering system in order to facilitate further automation of the industrial environment.

53 Claims, 10 Drawing Sheets

SYSTEM AND METHOD FOR MANAGING WELDING PROCEDURES AND WELDING RESOURCES

TECHNICAL FIELD

The present invention relates generally to computer and welding systems. More particularly, the present invention relates to a system and method for managing welding procedures and welding resources.

BACKGROUND OF THE INVENTION

Welding systems reside at the core of the modern industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Often, hundreds or perhaps thousands of welders are employed to drive multiple aspects of an assembly process, wherein sophisticated controllers enable individual welders to operate within relevant portions of the process. For example, some of these aspects relate to control of power and waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. These systems are often deployed over great distances in larger manufacturing environments and many times are spread across multiple manufacturing centers. Given the nature and requirements of modern and more complex manufacturing operations however, welding systems designers, architects and suppliers face increasing challenges in regard to upgrading, maintaining, controlling, servicing and supplying various welding locations. Unfortunately, many conventional welding systems operate in individually controlled and somewhat isolated manufacturing locations in regard to the overall assembly process. Thus, controlling, maintaining, servicing and supplying multiple and isolated locations in large centers, and/or across the globe, has become more challenging, time consuming and expensive.

One such challenge relates to managing welding procedures and welding resources suitable for a particular welding need. In arc welding, an electric arc provided intense heat to melt metal. The electric arc is formed between piece(s) of metal(s) being welded and an electrode (e.g., stick or wire) that is manually or mechanically guided along the joint. In addition to metal type(s) and electrode type(s), a variety of other parameter(s) can be specified in a welding procedure. For example, a type of voltage source (e.g., alternating current or direct current), voltage, current, wire feed speed, travel speed, part angle, contact tip to work distance, joint angle, torch angle, part angle, welding joint details along with consumable diameter type/combination and/or gaseous shield can be included in a welding procedure. Selecting or developing a suitable welding procedure for a particular need can be a difficult, time intensive task for engineers. In selecting a suitable welding procedure, the engineer typically searches for previous welding procedures that are potentially suitable for the particular welding need. Further, in order to select a cost effective welding procedure, the engineer requires knowledge of the purchasing and inventory history. The engineer then calculates the relative weld costs for potentially suitable welding procedure(s) in order to determine the most cost effective one. This can be time-consuming and can lead to inconsistent or less than optimal results since conventionally physical documentation of welding procedures has typically been incomplete and inconsistent.

Another challenge relating to managing of welding procedures and welding resources relates to ordering and supplying perishable items for the welding systems. These items may include wire, gas, and other components associated with the welding process. Conventionally, these materials are often tracked and ordered by operators or supervisors responsible for the process. This generally involves manually inventorying and keeping track of projected production needs and then ordering supplies long enough in advance so that production may continue. As welding procedures are added, deleted or changed to accommodate particular welding needs, ordering and inventory systems should reflect the production needs associated with the added, deleted or changed welding procedures. Manual processes such as are involved with ordering and inventory activities are time consuming and often require duplication of efforts by multiple people and departments. When orders are finally placed, mistakes can occur as catalog and/or part numbers are given to suppliers. Additionally, suppliers and distributors often have trouble planning for expected demands, since knowledge of actual product usage may not be gained until the order is actually placed.

Due to the problems described above and other problems associated with conventional systems, there is an unsolved need for a system and method for managing welding procedures and welding resources.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

As used in this application, "system" is a structure comprising one or more components. A "component" is a structure comprising computer hardware and/or software. For example, a component can be, but is not limited to, a computer readable memory encoded with software instructions or a computer configured to carry out specified tasks. By way of illustration, both an application program stored in computer readable memory and a server on which the application runs can be components. Due to the nature of components, multiple components can be intermingled and are often not separate from one another. Systems can likewise be intermingled and inseparable.

"Welding procedure" refers to a step or steps involved in a joining process and can include consumables to be used in the process along with settings for various aspects of a welding system before, during and/or after the joining process. For example, some of these aspects relate to control of power and waveforms supplied to an electrode, movements or travel of a welding tip during welding, electrode travel to other welding points, gas control to protect a molten weld pool from oxidation at elevated temperatures and provide ionized plasma for an arc, and other aspects such as arc stability to control quality of the weld. "Welding system" refers to hardware and/or software components involved in the joining process and can include, but is not limited to, a power source, a gas controller, a wire feeder, a contact tip, a gas cone and contact tip conditioner (commonly referred to as a dresser), a gas mixer, a gas anti-spatter injection system (commonly referred to as a sneezer), a gas controller, a clamp actuator, a robot arm/beam/torch manipulator, a seam tracker, a wire drive and gun, a water cooler, a welder, a part handler, a torch travel and a user control.

The present invention relates to a system and method for managing welding procedures and welding resources in which a welding system is connected to a local server via a local network through a server & network interface. The welding system includes one or more welding procedures. Likewise, the local server has one or more local welding procedures. A user desiring to join pieces of metal submits weld parameter(s) to the welding system. In response to the user's submission, the welding system is adapted to search its welding procedures and welding procedures on the local server for potentially suitable welding procedure(s). The welding system calculates weld costs for potentially suitable welding procedure(s) and presents information to the user. Optionally, the welding system can filter search results of potentially suitable welding procedure(s) based upon items (e.g., consumables) stocked.

Yet another aspect of the present invention provides for the welding system to be connected to a remote system having one or more remote welding procedures. In addition to searching the welding system and the local server, the welding system is adapted to search the remote system for potentially suitable welding procedure(s). Further, the present invention provides for the welding system, the local server and/or the remote system to dynamically create welding procedure(s) based, at least in part, upon weld parameter(s) and/or information stored in welding procedures, local welding procedures and/or remote welding procedures.

Another aspect of the present invention provides for the welding system to communicate information regarding a selected welding procedure to an inventory system and/or an ordering system to facilitate inventory management and ordering. The present invention further provides for automating qualification of welding procedures.

The present invention also provides methods for managing welding procedures and welding resources, searching for welding procedures, filtering potentially suitable welding procedure(s) based upon commonality of parts and automation of the welding procedures qualification and documentation process.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

Figure 1:
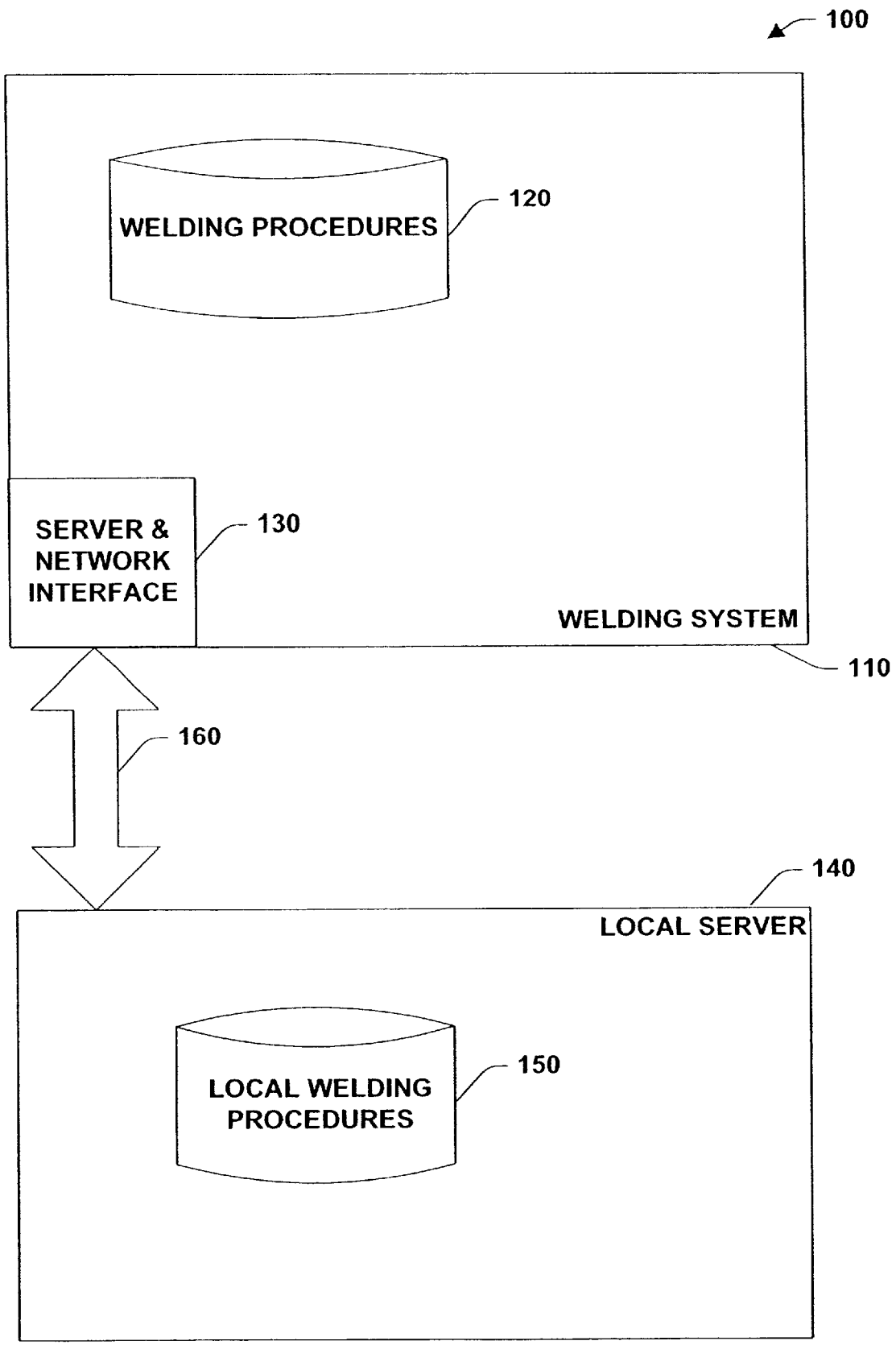
FIG. 1 is a schematic block diagram illustrating a system for managing welding procedures in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

Referring to FIG. 1, a system 100 for managing welding procedures is illustrated. The system 100 includes a welding system 110 that is operatively coupled via a local network 160 through a server & network interface 130 to a local server 140. For example, the local network 160 may employ Ethernet (IEEE 802.3), Wireless Ethernet (IEEE 802.11), PPP (point-to-point protocol), WAP (Wireless Application Protocol) and Bluetooth. The welding system 110 includes one or more welding procedures that are collectively referred to as welding procedures 120. The local server 140 also includes one or more welding procedures that are collectively referred to as local welding procedures 150.

The welding system 110 is adapted to receive weld parameter(s) which can be received in a plurality of ways. For example, the welding system 110 can be adapted to extract weld parameter(s) from a user query (e.g., based upon natural language input). Further, a user query can be based upon a graphical template component requiring certain weld parameter(s) to be completed (e.g., type of welding system—welding process such as SMAW, GMAW, GTAW, FCAW-SS, FCAW-GS or SAW) and/or allowing yet other weld parameter(s) to be specified optionally (e.g., wire diameter, welding joint detail(s) including material thickness, shielding gas and/or desired weld nugget or physical property attribute(s)). Additionally, the weld parameter(s) can be based upon an adaptive system wherein the welding system itself is able to identify one, some and/or substantially all of the weld parameter(s) based upon information known to the welding system (e.g., type of welder, type of wire presently being utilized and/or type of gas presently being utilized). Thus, it is to be appreciated that in accordance with the present invention, the weld parameter(s) can be received, explicitly and/or implicitly, in a plurality of ways in accordance with the present invention.

In response to receiving weld parameter(s), the welding system 110 searches the welding procedures 120 to determine potentially suitable welding procedure(s). The welding system 110 can employ various searching techniques (e.g., based upon a Bayesian model, probability tree networks, fuzzy logic and/or neural network) when searching for potentially suitable welding procedure(s). The welding system 110 further communicates electronically via the local network 160 with the local server 140 to search the local welding procedures 150 to determine potentially suitable welding procedure(s). Further, the welding system 110 can dynamically create welding procedure(s) using artificial intelligence technique(s) (e.g., a Bayesian model, probability tree network, fuzzy logic model and/or neural network) based, at least in part, upon weld parameter(s), information stored in the welding procedures 120 and/or information stored in the local welding procedures 150. The welding system 110 can then present potentially suitable welding procedure(s) obtained from the welding procedures 120 and/or the local welding procedures 150 to the user.

Additionally, the welding system 110 can further be adapted to calculate a relative cost associated with potentially suitable welding procedure(s) and to present the potentially suitable welding procedure(s) and their associated relative costs to the user. The user (e.g., welding engineer) can then select an appropriate welding procedure based at least in part upon minimization of associated cost.

For example, a welding engineer desiring to load a welding system 110 with a welding procedure suitable for joining two pieces of ASTM A36 would communicate weld parameter(s), for example, type of welding machine (e.g., MIG welder), type of material, type of welding joint, welding joint attribute(s), material thickness, desired weld attribute(s), type/size of consumable(s) and/or available primary shield gas (e.g., argon) to the welding system 110. The communication can take place by a graphical user interface (not shown) or other system for sending alphanumeric data. The welding system 110 can then search its welding procedures 120 for potentially suitable welding procedure(s). The welding system 110 can also search the local welding procedures 150 stored on the local server 140. The welding system 110 can further dynamically create welding procedure(s) using artificial intelligence technique(s) (e.g., a Bayesian model, probability tree network, fuzzy logic model and/or neural network) based, at least in part, upon weld parameter(s), information stored in the welding procedures 120 and/or information stored in the local welding procedures 150. The welding system 110 can then calculate a cost associated with potentially suitable welding procedure(s). The welding system 110 then presents the potentially suitable welding procedure(s) and their relative costs to the welding engineer for his selection. In presenting the potentially suitable welding procedure(s) to the welding engineer for selection, the welding system can arrange the potentially suitable welding procedure(s), for example, based at least in part upon a calculated probability of usefulness (e.g., welding procedures which have been previously used in the particular industrial environment having a higher probability of usefulness). Further, the welding system 110 can store the welding procedure selected and/or adaptively modify its searching technique for future searches based upon the user's selection (e.g., learn from the welding procedure selected by the user).

Figure 2:
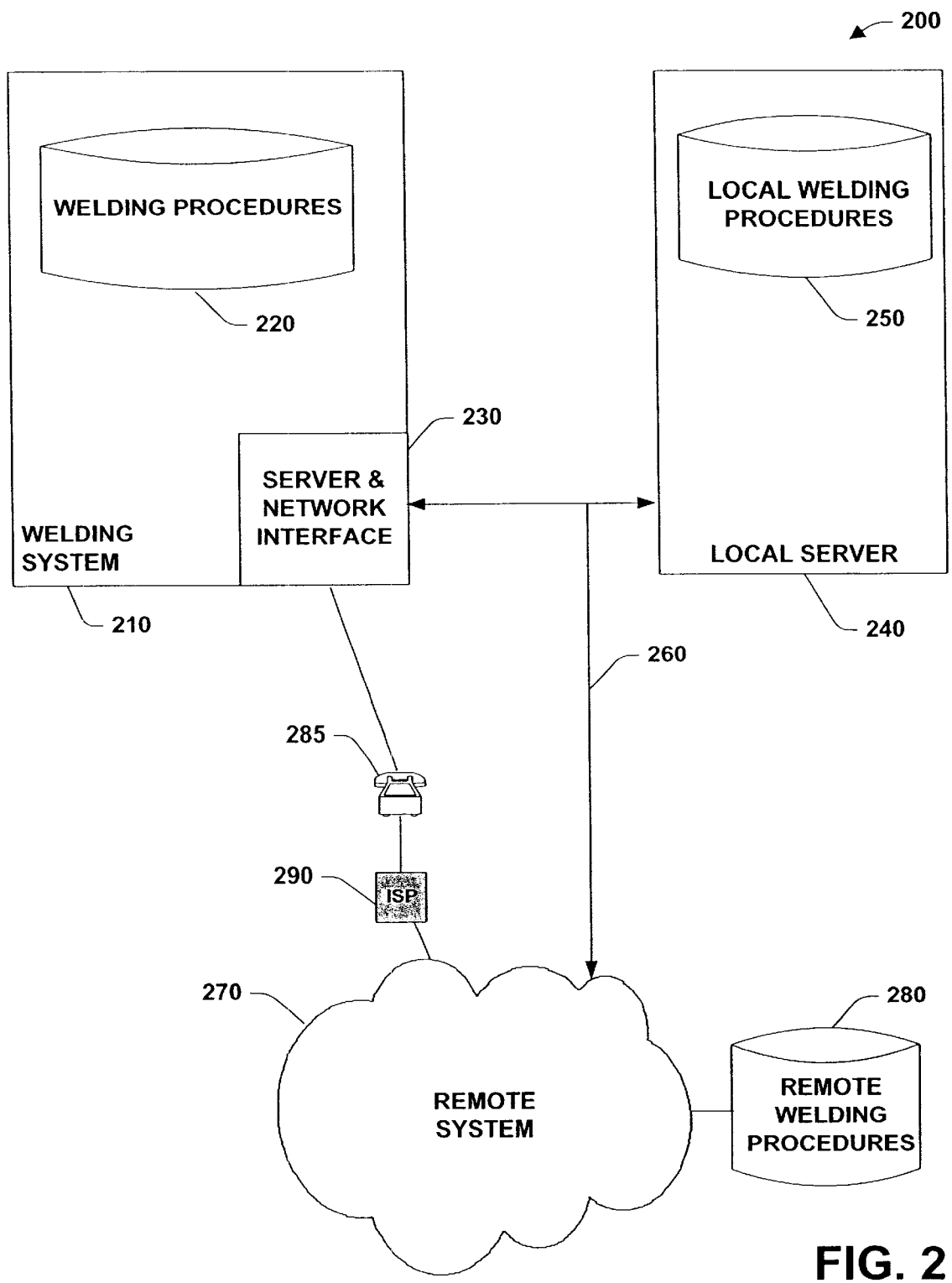
FIG. 2 is a schematic block diagram illustrating a system for managing welding procedures in accordance with an aspect of the present invention.

Next, referring to FIG. 2, a system 200 for managing welding procedures is illustrated. The system 200 includes a welding system 210 that is operatively coupled via a local network 260 through a server & network interface 230 to a local server 240. The welding system 210 includes one or more welding procedures that are collectively referred to as welding procedures 220. The local server 240 also includes one or more welding procedures that are collectively referred to as local welding procedures 250.

The welding system 210 can have one or more network connections to a remote system 270. For example, these connections can support an Internet protocol (e.g., Internet Protocol version 6). One possible connection is supported via a phone connection 285 to an Internet Service Provider (ISP) 290 to the remote systems 270. Another possible connection is via a Local Area Network (LAN) 260 to the remote system 270. It is noted that the welding system 210 and associated welding equipment (not shown) can communicate over a separate and isolated network from the remote systems 270 (e.g., Arclink). The remote system 270 includes one or more welding procedures that are collectively referred to as remote welding procedures 280.

The welding system 210 is adapted to receive weld parameter(s) which, as discussed supra, can be received in a plurality of ways. For example, the welding system 210 can be adapted to extract weld parameter(s) from a user query, the user query can be based upon a graphical template component requiring certain weld parameter(s) to be completed and/or allowing yet other weld parameter(s) to be specified optionally and/or the weld parameter(s) can be based upon an adaptive system wherein the welding system itself is able to identify one, some and/or substantially all of the weld parameter(s) based upon information known to the welding system. Thus, the weld parameter(s) can be received, explicitly and/or implicitly, in a plurality of ways in accordance with the present invention.

In response to receiving weld parameter(s), the welding system 210 searches the welding procedures 220 to determine potentially suitable welding procedure(s). For example, a welding engineer desiring to load a welding system 210 with a welding procedure suitable for joining two pieces of stainless steel can communicate weld parameter(s) (e.g., TIG welder utilizing a shielding gas of argon) to the welding system 210. The communication can take place via a graphical user interface (not shown) or other device for sending alphanumeric data. The welding system 210 can then search its welding procedures 220 for potentially suitable welding procedure(s). The welding system 210 can also search the local welding procedures 250 stored on the local server 240. The welding system 210 can then search the remote systems 280 for potentially suitable welding procedure(s). The welding system 210 can employ various searching techniques (e.g., based upon a Bayesian model, probability tree networks, fuzzy logic and/or neural network) when searching for potentially suitable welding procedure(s). When the potentially suitable welding procedure(s) have been accumulated, an aggregation of accumulated potentially suitable welding procedure(s) can be performed. Further, the welding system 210 can dynamically create welding procedure(s) using artificial intelligence technique(s) (e.g., a Bayesian model, probability tree network, fuzzy logic model and/or neural network) based, at least in part, upon weld parameter(s), information stored in the welding procedures 220, information stored in the local welding procedures 250 and/or information stored in the remote welding procedures 280.

The welding system 210 can then calculate a cost associated with potentially suitable welding procedure. The welding system 210 then presents the potentially suitable welding procedure(s) and associated costs to the welding engineer for selection. In presenting the potentially suitable welding procedure(s) to the welding engineer for selection, the welding system 210 can organize the potentially suitable welding procedure(s), for example, based at least in part upon a calculated probability of usefulness (e.g., welding procedures which have been previously used in the particular industrial environment having a higher probability of usefulness). Further, the welding system 210 can store the welding procedure selected and/or adaptively modify its searching technique for future searches based upon the user's selection (e.g., learn from the welding procedure selected by the user).

Figure 3:
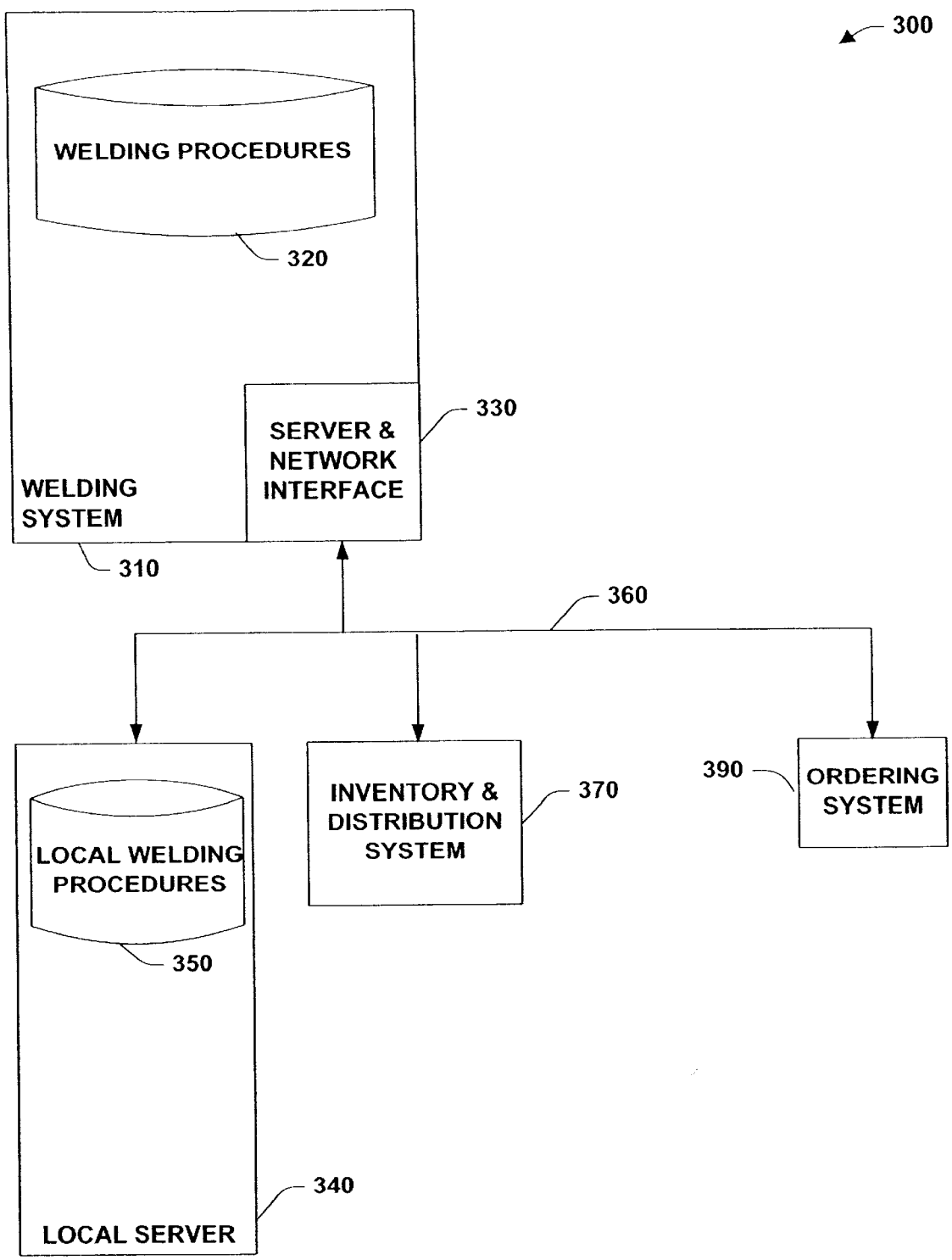
FIG. 3 is a schematic block diagram illustrating a system for managing welding procedures and welding resources in accordance with an aspect of the present invention.

Referring to FIG. 3, a system 300 for managing welding procedures and welding resources is illustrated. The system includes a welding system 310 that is operatively coupled via a local network 360 through a server & network interface 330 to a local server 340. For example, the local network 360 may employ Ethernet (IEEE 802.3), Wireless Ethernet (IEEE 802.11), PPP (point-to-point protocol), WAP (Wireless Application Protocol) and Bluetooth. The welding system 310 includes one or more welding procedures that are collectively referred to as welding procedures 320. The local server 340 also includes one or more welding procedures that are collectively referred to as local welding procedures 350.

The welding system 310 is adapted to receive weld parameter(s). As discussed supra, the weld parameter(s) can be received from a user in a plurality of ways. Further, one, some and/or substantially all of the weld parameter(s) can be identified by the welding system 310 based upon information known to the welding system 310.

In response to receiving weld parameter(s), the welding system 310 searches the welding procedures 320 to determine potentially suitable welding procedure(s). The welding system 310 can employ various searching techniques (e.g., based upon a Bayesian model, probability tree networks, fuzzy logic and/or neural network) when searching for potentially suitable welding procedure(s). The welding system 310 communicates electronically via the local network 360 with the local server 340 to search the local welding procedures 350 to determine potentially suitable welding procedure(s). As described above, the welding system 310 can further search remote systems (not shown) for potentially suitable welding procedure(s) and/or dynamically create welding procedures.

The welding system 310 can also be adapted to filter the potentially suitable welding procedure(s) based upon consumable(s) (e.g., wire, gas, and other components) associated with the welding procedure. In this manner, the welding system 310 can utilize consumable(s) (e.g., wire, gas, and other components) common to welding procedures of the welding system 310 or other welding system within the industrial environment. The inventory & distribution system 370 and/or the ordering system 390 can be operatively coupled to the welding system 310 via the local network 360. The welding system 310 can search the inventory & distribution system 370 to determine, for example, whether consumable(s) for potentially suitable welding procedure(s) is stocked within the industrial environment in order to increase use of common consumable(s) which can result in economic savings.

The welding system 310 can further be adapted to calculate a relative cost associated with potentially suitable welding procedure(s). The welding system 310 can present the potentially suitable welding procedure(s), an indication of common consumable(s) for the potentially suitable welding procedure(s), and their associated relative costs to the user. The user (e.g., welding engineer) can then select an appropriate welding procedure based at least in part upon common consumable(s) and/or minimization of associated cost.

In presenting the potentially suitable welding procedure(s) to the welding engineer for selection, the welding system 310 can organize the potentially suitable welding procedure(s), for example, based at least in part upon a calculated probability of usefulness (e.g., welding procedures which have been previously used in the particular industrial environment having a higher probability of usefulness). Further, the welding system 310 can store the welding procedure selected and/or adaptively modify its searching technique for future searches based upon the user's selection (e.g., learn from the welding procedure selected by the user).

After the user selects the welding procedure to be utilized, the inventory & distribution system 370 can be updated in order to accommodate resources (e.g., consumables and/or other materials) used by the selected welding procedure. Further, the ordering system 390 can also be updated to reflect changes in ordering needs related to the selected welding procedure (e.g., potential increase in particular wire diameter consumption).

For example, a welding engineer desiring to load a welding system 310 with a welding procedure suitable for joining two pieces of material would communicate the weld parameter(s) (e.g., stick welder) to the welding system 310. The communication can take place by a graphical user interface (not shown) or other device for sending alphanumeric data. The welding system 310 would then search its welding procedures 320, the local welding procedures 350 and/or any remote systems (not shown) for potentially suitable welding procedure(s). For example, the search could yield four distinct welding procedures each suitable for welding the two pieces of steel. The welding system 310 would then search the inventory & distribution system 370 to determine whether consumable(s) utilized by the potentially suitable welding procedure(s) (e.g., consumable electrodes used by the stick welder) are stocked in inventory (e.g., in common with another welding procedure). The welding system 310 can then calculate a cost associated with the potentially suitable welding procedure(s). The welding engineer can then be informed regarding the associated costs of the potentially suitable welding procedure(s) and whether the potentially suitable welding procedure(s) utilizes consumable(s) stocked within the industrial environment.

Further, the welding system 310 can communicate information regarding the welding procedure selected by the engineer and/or consumable(s) associated with the selected welding procedure to the inventory & distribution system 370 and/or ordering system 390 in order to accommodate resources (e.g., consumables and/or other materials) used by the selected welding procedure. Further, the ordering system 390 can also be updated to reflect changes in ordering needs related to the selected welding procedure (e.g., potential increase in particular wire diameter consumption). The welding system 310 can store the selected welding procedure on the local server 340.

Once the selected welding procedure has been loaded into the welding system 310, the welding system 310 can determine whether the selected welding procedure has previously been qualified. If the selected welding procedure has not previously been qualified and/or otherwise approved for use in the industrial environment (e.g., a procedure qualification record exists), a procedure qualification record can be prepared by the welding system 310. Further, the welding system 310 can update the part documentation (e.g., the procedure qualification record is updated to reflect the particular part for which the welding procedure will be used). Thus, the process of documenting welding procedure qualification can be automated resulting in time savings for the welding engineer and decreasing documentation errors.

Figure 4:
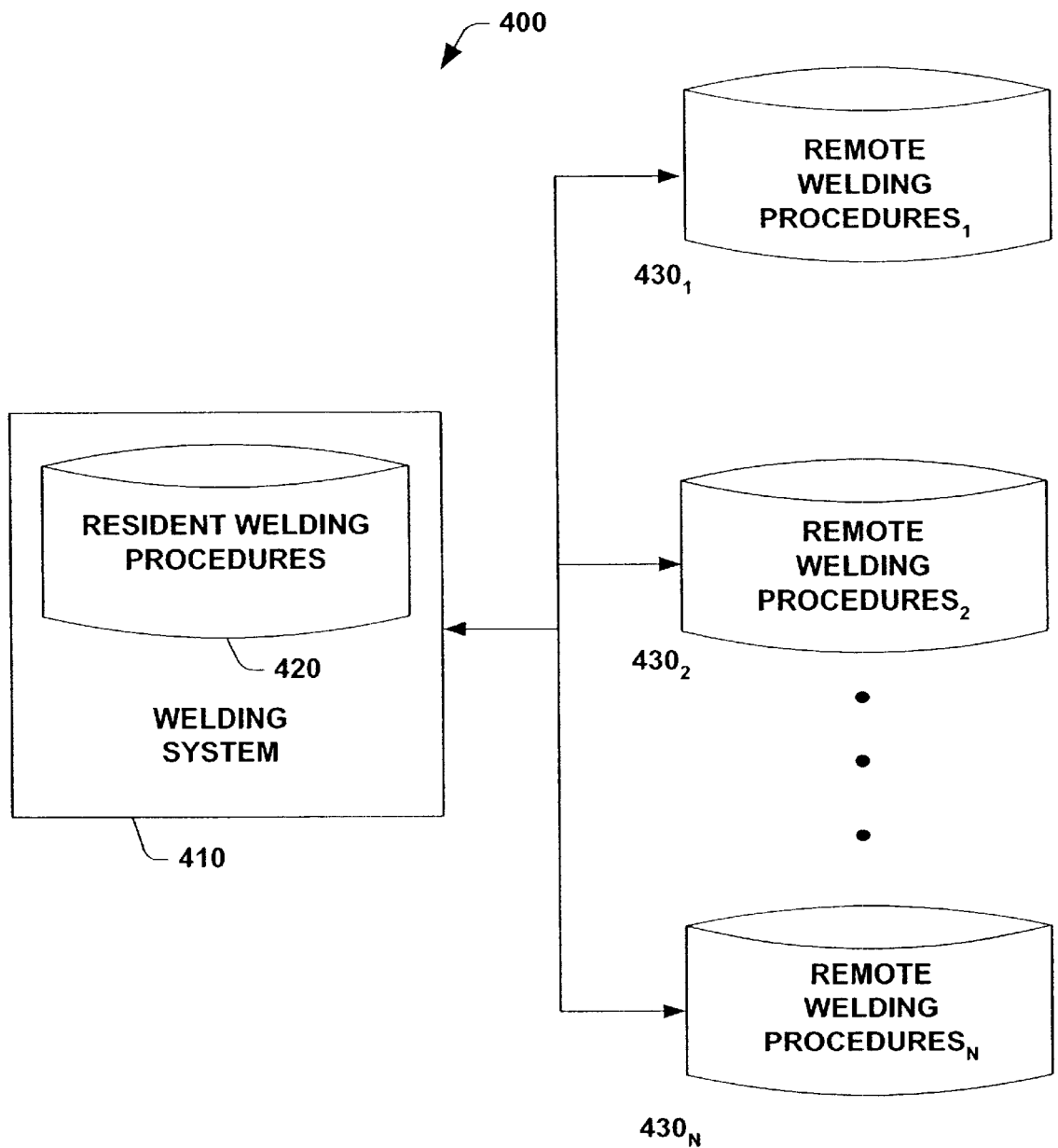
FIG. 4 is a schematic block diagram illustrating a system for managing welding procedures in accordance with the present invention.

Turning next to FIG. 4, a system 400 for managing welding procedures is illustrated. The system includes a welding system 410 that is operatively coupled to a first remote welding procedure $430_1$, a second remote welding procedure $430_2$ through an Nth welding procedure $430_N$. The remote welding procedures $430_1$, $430_2$ through $430_N$ can collectively be referred to as the remote welding procedures 430. The coupling of the welding system 410 and the remote welding procedures 430 can be, for example, by local area network (e.g., Ethernet (IEEE 802.3), Wireless Ethernet (IEEE 802.11), PPP (point-to-point protocol), WAP (Wireless Application Protocol) or Bluetooth.) and wide area network (WAN) such as the Internet. The welding system 410 includes one or more welding procedures that are collectively referred to as resident welding procedures 420.

The welding system 410 is adapted to receive weld parameter(s) which, as discussed supra, can be received in a plurality of ways. For example, the welding system 410 can be adapted to extract weld parameter(s) from a user query, the user query can be based upon a graphical template component requiring certain weld parameter(s) to be completed and/or allowing yet other weld parameter(s) to be specified optionally and/or the user query can be based upon an adaptive system wherein the welding system itself is able to identify one, some and/or substantially all of the welding parameters based upon information known to the welding system 410. Thus, the welding parameters can be received, explicitly and/or implicitly, in a plurality of ways in accordance with the present invention.

In response to receiving weld parameter(s), the welding system 410 searches the resident welding procedures 420 to determine potentially suitable welding procedure(s). The welding system 410 searches the remote welding procedures 430 to determine potentially suitable welding procedure(s). The welding system 410 can employ various searching techniques (e.g., based upon a Bayesian model, probability tree networks, fuzzy logic and/or neural network) when searching for potentially suitable welding procedure(s). Further, the welding system 410 can dynamically create welding procedure(s) using artificial intelligence technique(s) (e.g., a Bayesian model, probability tree network, fuzzy logic model and/or neural network) based, at least in part, upon weld parameter(s) and/or information stored in the remote welding procedures 430. When the potentially suitable welding procedure(s) have been accumulated, an aggregation of accumulated potentially suitable welding procedure(s) can be performed.

The welding system 410 can then calculate a cost associated with potentially suitable welding procedure(s). The welding system 410 then presents the potentially suitable welding procedure(s) and associated costs to the user for selection.

Figure 5A:
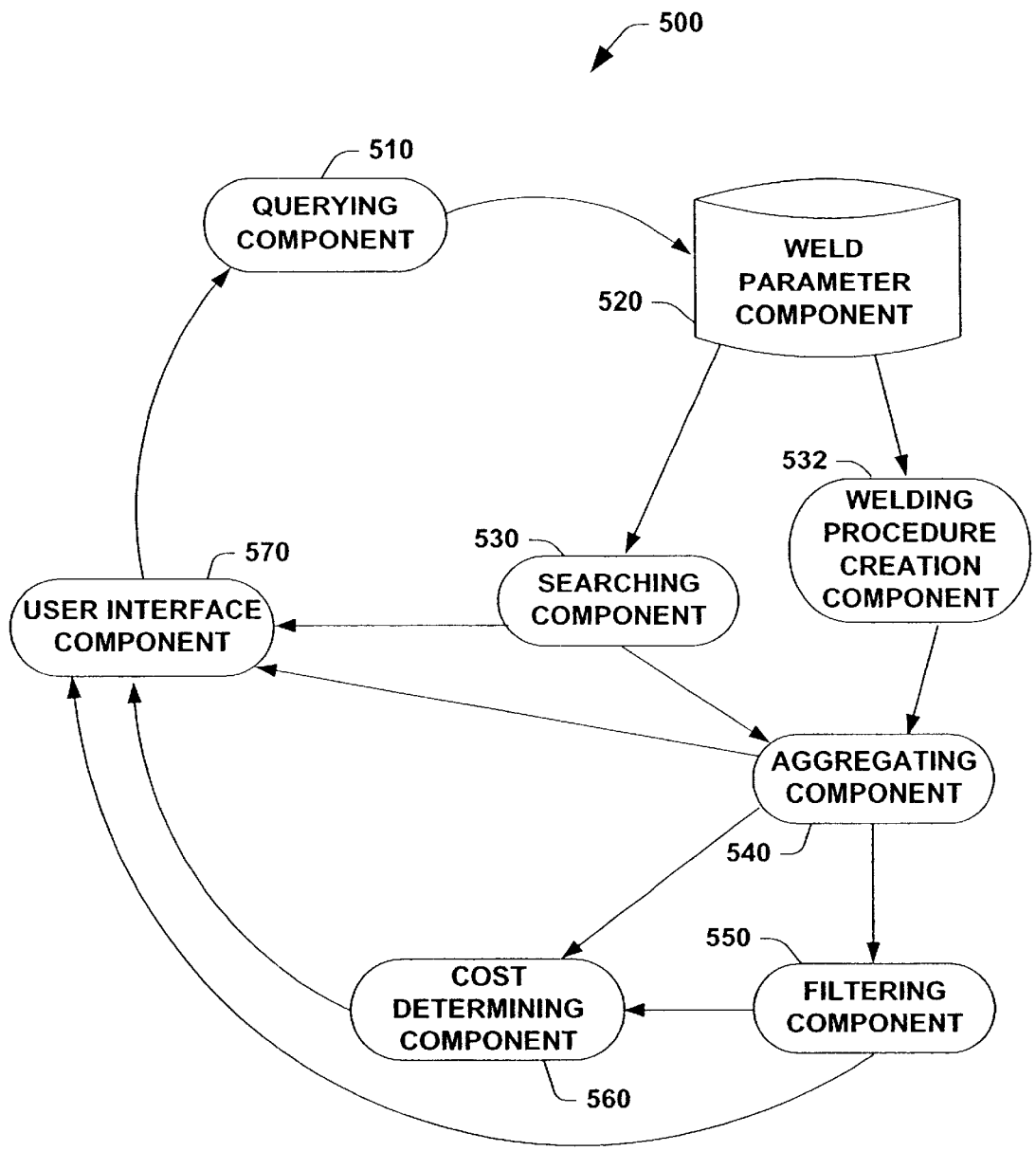
FIG. 5a is a block diagram illustrating a system for managing welding procedures in accordance with the present invention.

Referring to FIG. 5a, a system 500 for managing welding procedures is illustrated. The system 500 includes a user interface component 570 for receiving user input and transmitting information to the user. For example, the user interface component can be a computer system equipped with a graphical display and keyboard. The system 500 can further include a querying component 510 for extracting weld parameter(s). For example, the querying component 510 can utilize artificial intelligence methods to extract weld parameter(s) from a user query (e.g., natural language input).

In response to a user query communicated via the user interface component 570, the querying component 510 can extract weld parameter(s) that are communicated to a weld parameter component 520. Further, the user interface component 570 can directly communicate weld parameter(s) to the weld parameter component 520. Additionally, the weld parameter component 520 can identify some and/or substantially all of the welding parameter(s) based upon information known to the system 500 (e.g., type of welder, type of wire presently being utilized and/or type of gas presently being utilized)

The system 500 further includes a searching component 530 that can search welding procedure(s): resident on a welding system, stored on a local area network and/or stored remote on a remote system. The system 500 can employ various searching techniques (e.g., based upon a Bayesian model, probability tree networks, fuzzy logic and/or neural network) when searching for potentially suitable welding procedure(s).

The system 500 can also include a welding procedure creation component 532 that can dynamically create welding procedure(s) using artificial intelligence technique(s) (e.g., a Bayesian model, probability tree network, fuzzy logic model and/or neural network) based, at least in part, upon weld parameter(s) and/or information resident on a welding system, stored on a local area network and/or stored remote on a remote system.

The system 500 also includes an aggregating component 540 that can aggregate results of the searching component 530 and/or welding procedure creation component 532 into a format for presentation to the user via the user interface component 570. Additionally, the aggregating component 540 can communicate with a filtering component 550 that filters results of the searching component 530 based upon, for example, commonality of consumables in inventory.

The system 500 can include a cost determining component 560. The cost determining component 560 calculates relative weld costs associated with results of the aggregating component 540 or the filtering component 550 and presents the relative weld costs to the user via the user interface component 570.

Figure 5B:
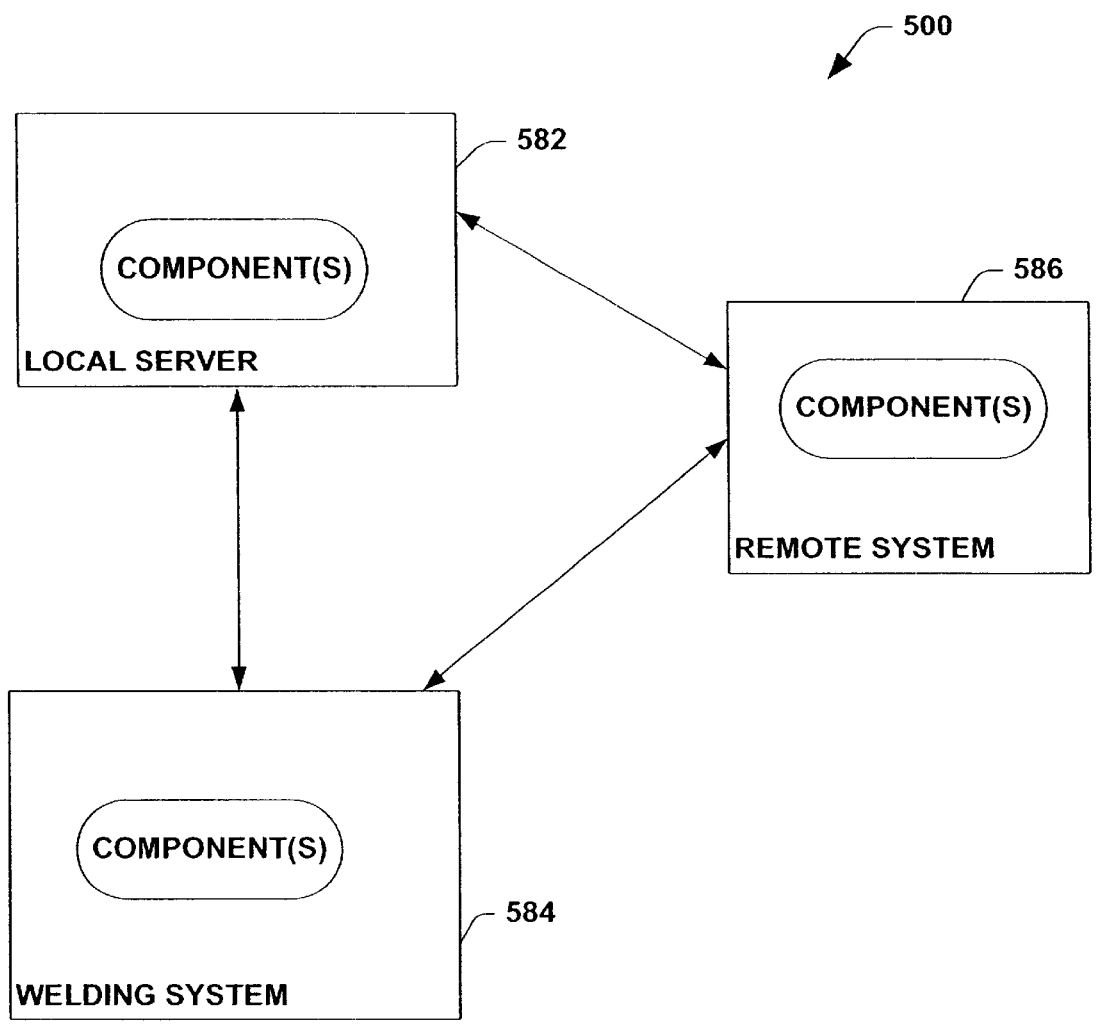
FIG. 5b is a block diagram illustrating a system for managing welding procedures in accordance with the present invention.

Referring to FIG. 5b, it is to be appreciated that one, a plurality or all of the components comprising the system 500 can be resident on a welding system 584, a local server 582 and/or a remote system 586 within the scope of the present invention. For example, the user interface component 570 can be resident on the welding system 584, the querying component 510 resident on a local server 582 with the remaining components resident on a remote system 586. Moreover, it is to be appreciated that a particular type of component (e.g., welding procedure creation component 532) may be resident at more than one location at the same time. Protocols for mitigating contention and/or latency and/or conflict by like components would be used.

FIGS. 6 through 9 illustrate a methodology for providing various aspects of a distributed welding architecture in accordance with the present invention. The method comprises a group of actions or processes represented by blocks. While, for purposes of simplicity of explanation, the methodology is shown and described as a series of blocks, it is to be understood and appreciated that the present invention is not limited by the number or order of blocks, as some blocks may, in accordance with the present invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated acts may be required to implement a methodology in accordance with the present invention.

Figure 6:
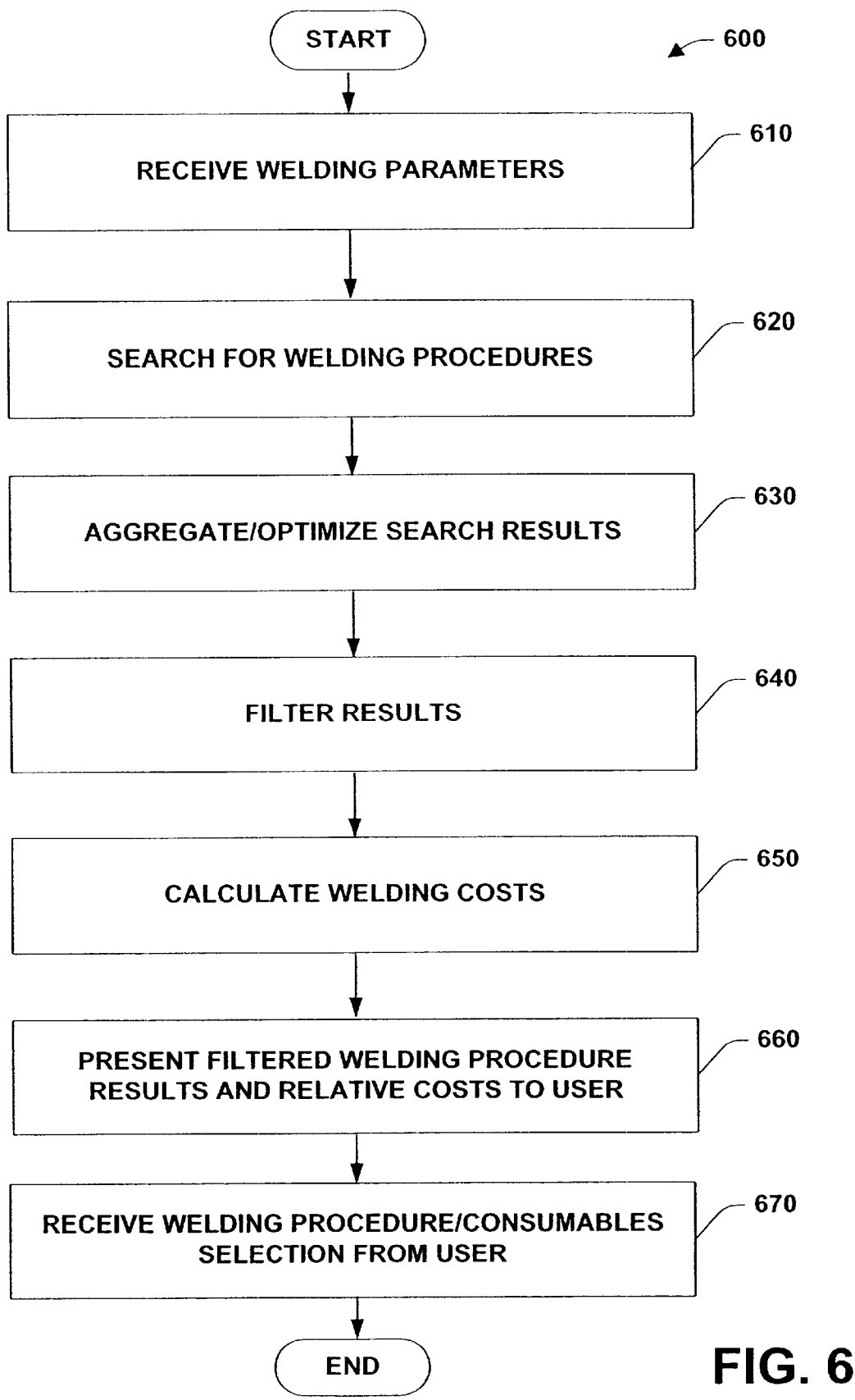
FIG. 6 is a flow chart diagram illustrating a methodology for managing welding procedures in accordance with an aspect of the present invention.

Turning to FIG. 6, a methodology for managing welding procedures is illustrated. At 610, the weld parameter(s) are received. The weld parameter(s) can be received in a plurality of ways, for example, the welding system can be adapted to extract weld parameter(s) from a user query, the user query can be based upon a graphical template component requiring certain weld parameter(s) to be completed and/or allowing yet other weld parameter(s) to be specified optionally and/or the user query can be based upon an adaptive system wherein the welding system itself is able to identify one, some and/or substantially all of the welding parameters based upon information known to the welding system.

Next, at 620 a search is conducted for potentially suitable welding procedure(s). For example, a search of the welding system itself, any local servers and/or any remote systems can be conducted. The search can employ various searching techniques (e.g., based upon a Bayesian model, probability tree networks, fuzzy logic and/or neural network) when searching for potentially suitable welding procedure(s).

Next, at 630, the search results are aggregated and/or optimized. At 640, the search results are filtered. For example, the search results can be filtered depending upon consumable(s) stocked in inventory; potentially suitable welding procedure(s) utilizing consumable(s) not maintained in stocked can be discarded or otherwise noted to the user. At 650, weld costs associated with the potentially suitable welding procedure(s) are calculated. At 660, weld costs associated with the filtered potentially suitable welding procedure are presented to the user. At 670, the user selects a welding procedure from the filtered potentially suitable welding procedure(s).

Figure 7:
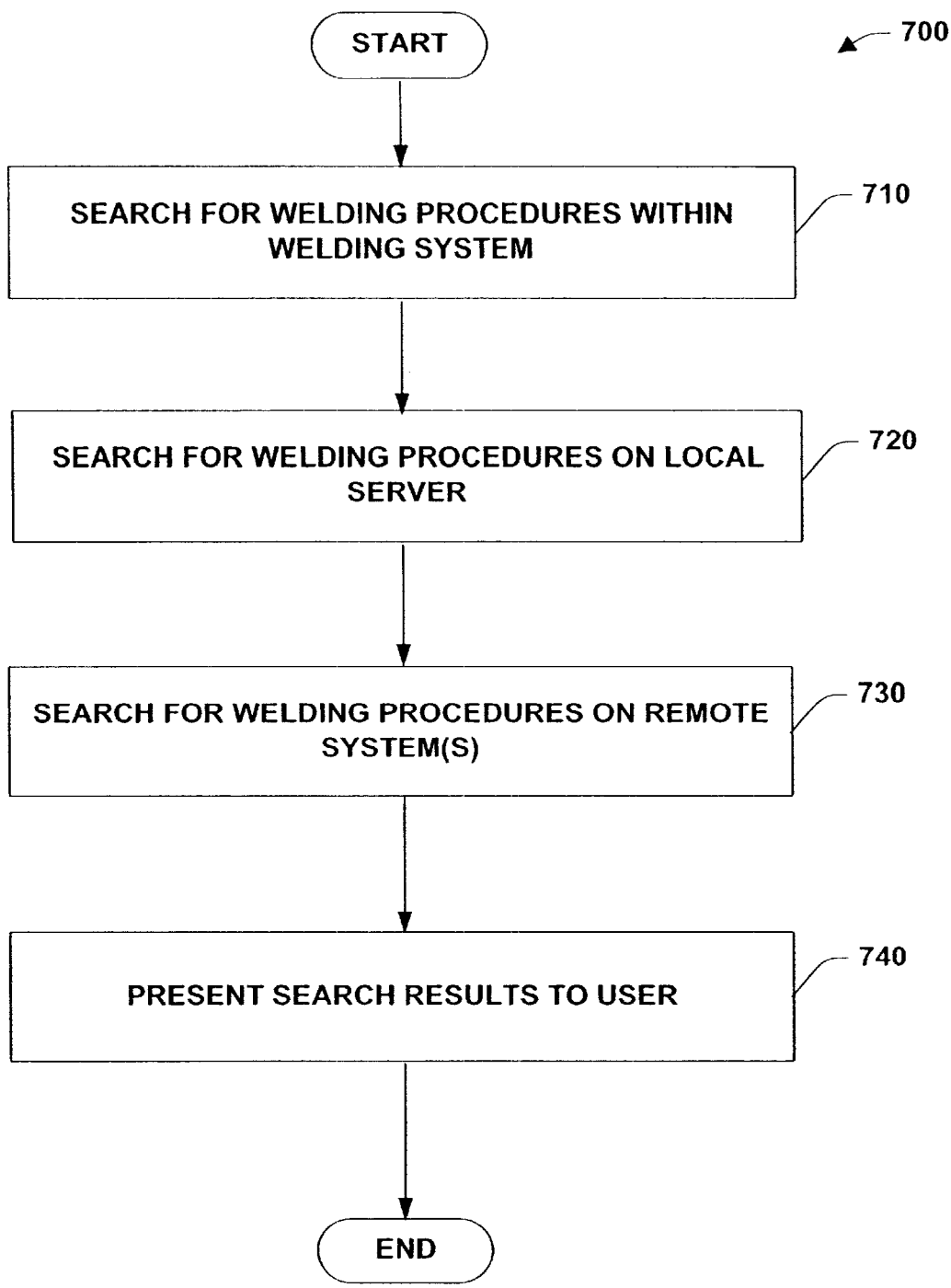
FIG. 7 is a flow chart diagram illustrating a methodology for managing welding procedures in accordance with an aspect of the present invention.

Referring to FIG. 7, a methodology of searching for welding procedures is illustrated. At 710, welding procedures are searched for within the welding system. At 720, welding procedures are searched for within the local server. At 730, welding procedures are searched for within remote systems. The search results are then aggregated and presented to the user at 740.

Figure 8:
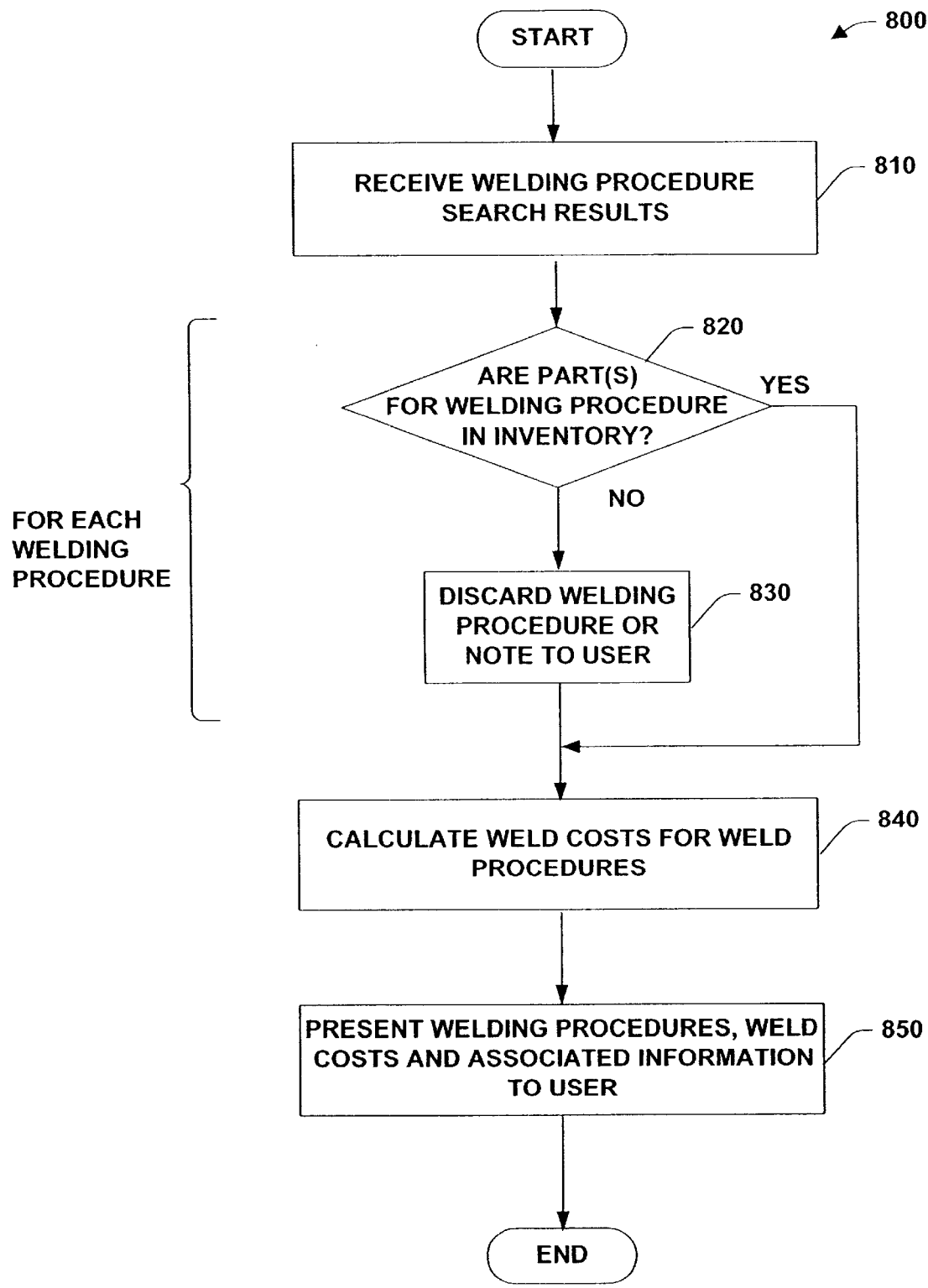
FIG. 8 is a flow chart diagram illustrating a methodology for filtering potentially suitable welding procedures in accordance with an aspect of the present invention.

FIG. 8 illustrates a methodology for filtering potentially suitable welding procedure(s). At 810, the results of the search for potentially suitable welding procedure(s) are received. For each potentially suitable welding procedure, at 820, a determination is made whether the consumable(s) for the welding procedure are in inventory. If the determination at 820 is NO, the welding procedure is discarded or noted to the user. At 840, the weld costs associated with each remaining potentially suitable welding procedure is calculated. At 850, the potentially suitable welding procedure(s) are presented to the user.

Figure 9:
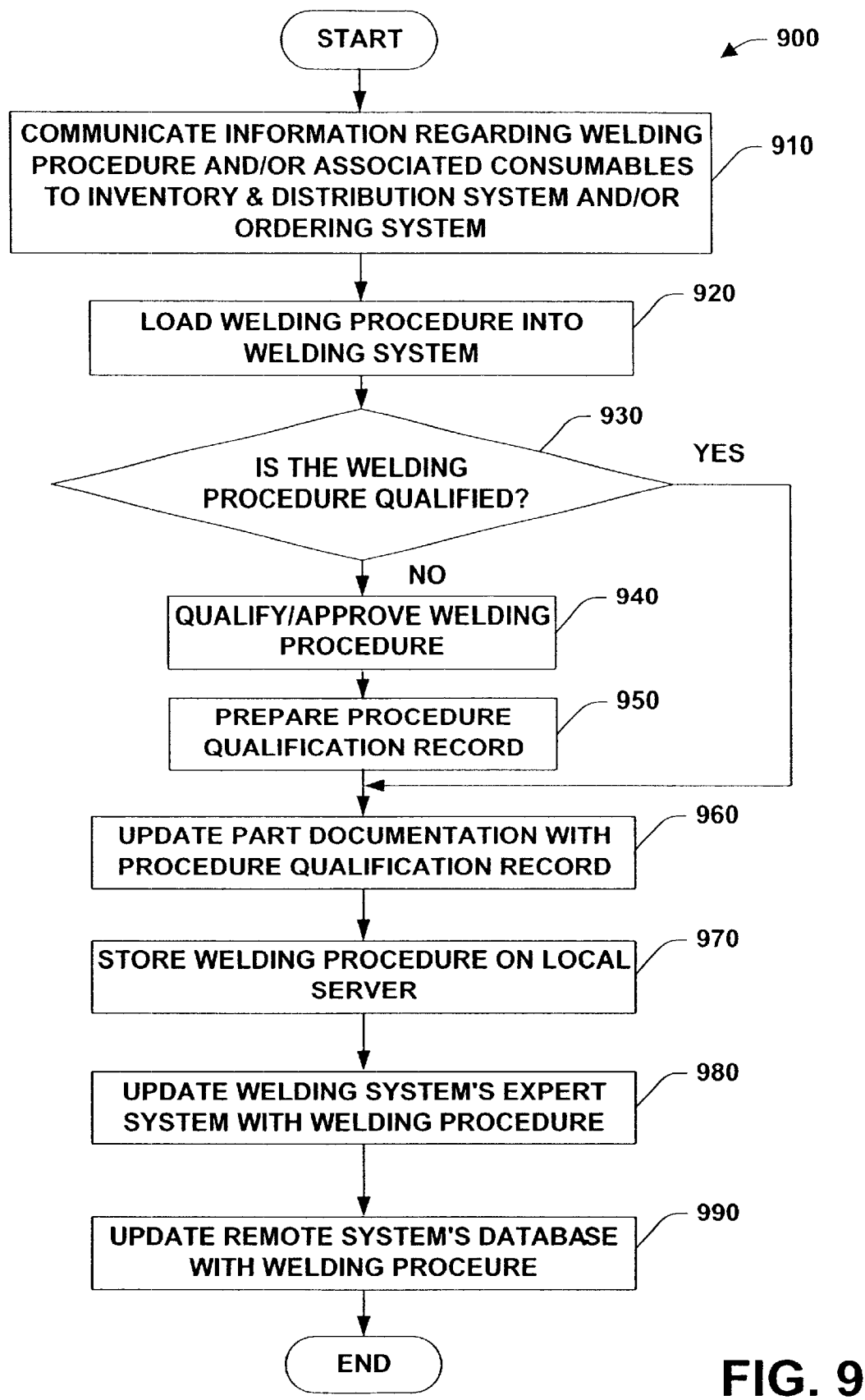
FIG. 9 is a flow chart diagram illustrating a methodology for managing welding procedures and welding resources in accordance with an aspect of the present invention.

FIG. 9 illustrates a methodology for managing welding procedures and welding resources is illustrated. At 910, information regarding the welding procedure and/or its associated consumable(s) is communicated to the inventory & distribution system and/or ordering system. At 920, the welding procedure is loaded into the welding system. At 930, a determination is made whether the welding procedure has previously been qualified. If the determination at 930 is NO, at 940 the welding procedure is qualified and/or otherwise approved for use in the industrial environment (e.g., a procedure qualification record exists). At 950, the procedure qualification record is prepared. If the determination at 930 is YES, processing continues at 960. At 960, the part documentation is updated (e.g., the procedure qualification record is updated to reflect the particular part for which the welding procedure will be used). At 970, the welding procedure is stored on the local server. At 980, the welding system's expert system is updated to reflect the welding procedure. At 990, the database of the remote system is updated to reflect the welding procedure.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations,modifications and variations that fall within the spirit and scope of the appended claims.

What is claimed is:

1. A system for managing welding procedures, comprising:
   a welding system having first welding procedures stored thereon and operatively coupled to a network;
   a local server having second welding procedures stored thereon and communicating with the welding system via the network; and,
   wherein the welding system is adapted to search the stored first welding procedures and the stored second welding procedures in response to a user query.

2. The system of claim 1, wherein the welding system is further adapted to calculate weld costs associated with a result of the search and to present the weld costs to the user.

3. The system of claim 1, wherein the first welding procedures and the second welding procedures include at least one of voltage setting, waveform, wire feed speed, part angle, joint angle, torch angle, welding joint detail, movement of a welding tip, travel of a welding tip, gas control, wire diameter, welder type, metal type, wire type and gas type.

4. The system of claim 1, wherein the network employs one of Ethernet, Wireless Ethernet, PPP (point-to-point protocol), point-to-multipoint short-range RF (Radio Frequency), WAP (Wireless Application Protocol), Bluetooth, IP, IPv6, TCP and User Datagram Protocol (UDP).

5. The system of claim 1, further comprising an inventory & distribution system to facilitate inventory management, wherein the welding system is adapted to filter the search results based at least in part upon information included in the inventory & distribution system.

6. The system of claim 1, further comprising an ordering system to facilitate ordering of a consumable wherein the welding system is adapted to initiate ordering of the consumable associated with the welding procedure selected by the user by communicating with the ordering system.

7. The system of claim 1, wherein the welding system presents results of the search to the user.

8. The system of claim 1, wherein the welding system further comprises a graphic user interface (GUI) to enable managing welding procedures and welding resources.

9. The system of claim 1, wherein the welding system includes at least one of a power source, a gas controller, a wire feeder, a contact tip, a gas cone and contact tip conditioner, a gas mixer, a gas anti-spatter injection system, a gas controller, a clamp actuator, a robot arm/beam/torch manipulator, a seam tracker, a wire drive and gun, a water cooler, a welder, a part handler, a torch travel and a user control.

10. The system of claim 1, wherein the search is performed using one of a Bayesian model, a probability tree network, a fuzzy logic model and a neural network.

11. The system of claim 1, wherein the welding system is adapted to dynamically create a welding procedure based at least in part upon the user query using at least one of a Bayesian model, a probability tree network, a fuzzy logic model and a neural network.

12. A system for managing welding procedures, comprising:
a welding system having first welding procedures stored thereon and operatively coupled to a network;
a local server having second welding procedures stored thereon communicating with the welding system via the network;
at least one remote system having third welding procedures stored thereon; and,
wherein at least one of the welding system and the local server are operatively coupled to the remote system and the welding system is adapted to search the stored first welding procedures, the stored second welding procedures, and the stored third welding procedures in response to a user query.

13. The system of claim 12, wherein the welding system is further adapted to calculate a weld costs associated with a result of the search and to present the weld costs to the user.

14. The system of claim 12, further comprising at least one of a LAN, a phone connection, and a gateway to couple the remote system to the network.

15. The system of claim 12, wherein at least one of the welding system and the local server interface with the remote system via the Internet.

16. The system of claim 12, wherein the first welding procedures and the second welding procedures include at least one of voltage setting, waveform, wire feed speed, part angle, joint angle, torch angle, welding joint detail, movement of a welding tip, travel of a welding tip, gas control, wire diameter, welder type, metal type, wire type and gas type.

17. The system of claim 12, wherein the network employs at least one of Ethernet, Wireless Ethernet, PPP (point-to-point protocol), point-to-multipoint short-range RF (Radio Frequency), WAP (Wireless Application Protocol), Bluetooth, IP, IPv6, TCP and User Datagram Protocol (UDP).

18. The system of claim 12, further comprising an inventory & distribution system to facilitate inventory management, wherein the welding system is adapted to filter the search results based at least in part upon information included in the inventory & distribution system.

19. The system of claim 12, further comprising an ordering system to facilitate ordering of consumables wherein the welding system is adapted to initiate ordering of consumables for a welding procedure selected by the user by communicating with the ordering system.

20. The system of claim 12, wherein the welding system presents results of the search to the user.

21. The system of claim 12, wherein the welding system further comprises a graphic user interface (GUI) to enable managing welding procedures and welding resources.

22. The system of claim 12, wherein the welding system includes at least one of a power source, a gas controller, a wire feeder, a contact tip, a gas cone and contact tip conditioner, a gas mixer, a gas anti-spatter injection system, a gas controller, a clamp actuator, a robot arm/beam/torch manipulator, a seam tracker, a wire drive and gun, a water cooler, a welder, a part handler, a torch travel and a user control.

23. The system of claim 12, wherein the search is performed using one of a Bayesian model, a probability tree network, a fuzzy logic model and a neural network.

24. A system for managing welding procedures, comprising:
a welding system having first welding procedures stored;
at least one remote system having second welding procedures stored thereon; and,
wherein the welding system and the remote system are operatively coupled and the welding system is adapted to search the stored first welding procedures and the stored second welding procedures in response to a user query.

25. The system of claim 24, wherein the welding system is further adapted to calculate a weld costs associated with a result of the search and to present the weld costs to the user.

26. The system of claim 24, further comprising at least one of a LAN, a phone connection, and a gateway to couple the remote system to the welding system.

27. The system of claim 24, wherein the welding system and the remote system communicate via the Internet.

28. The system of claim 24, wherein the first welding procedures and the second welding procedures include at least one of voltage setting, waveform, wire feed speed, part angle, joint angle, torch angle, welding joint detail, movement of a welding tip, travel of a welding tip, gas control, wire diameter, welder type, metal type, wire type and gas type.

29. The system of claim 24, further comprising an inventory & distribution system to facilitate inventory management, wherein the welding system is adapted to filter the search results based at least in part upon information included in the inventory & distribution system.

30. The system of claim 24, further comprising an ordering system to facilitate ordering of material wherein the welding system is adapted to initiate ordering of material for a welding procedure selected by the user by communicating with the ordering system.

31. The system of claim 24, wherein the welding system presents results of the search to the user.

32. The system of claim 24, wherein the welding system further comprises a graphic user interface (GUI) to enable managing of welding procedures and welding resources.

33. The system of claim 24, wherein the welding system includes at least one of a power source, a gas controller, a wire feeder, a contact tip, a gas cone and contact tip conditioner, a gas mixer, a gas anti-spatter injection system, a gas controller, a clamp actuator, a robot arm/beam/torch manipulator, a seam tracker, a wire drive and gun, a water cooler, a welder, a part handler, a torch travel and a user control.

34. The system of claim 24, wherein the search is performed using one of a Bayesian model, a probability tree network, a fuzzy logic model and a neural network.

35. A method for managing welding procedures and welding resources, comprising:
receiving welding parameters;
searching for welding procedures;

calculating welding costs associated with a welding procedure; and, presenting welding procedure search results and relative welding costs to a user.

36. The method of claim 35, further comprising aggregating and/or optimizing search results.

37. The method of claim 35, further comprising filtering search results.

38. The method of claim 35, further comprising receiving welding procedure and/or associated consumable selection from a user.

39. The method of claim 35, wherein the act of searching for welding procedures further comprises:

searching for welding procedures within the welding system;

searching for welding procedures on a local server; and, searching for welding procedures on a remote system.

40. The method of claim 35, wherein the act of filtering search results further comprises:

determining whether items identified in a welding procedure are in inventory;

discarding a welding procedure; and, noting to a user whether items identified in a welding procedure are in inventory.

41. A method for managing welding procedures and welding resources, comprising:

communicating information regarding a welding procedure and/or associated consumables to an inventory & distribution system and/or ordering system;

loading the welding procedure into a welding system;

determining whether the welding procedure is qualified;

qualifying and/or approving the welding procedure;

preparing a procedure qualification record;

updating a part documentation with the procedure qualification record;

storing the welding procedure on a local server;

updating the welding system's expert system with the welding procedure; and, updating a remote system's database with the welding procedure.

42. The method of claim 41, wherein the act of communicating information regarding a welding procedure and/or associated consumables further comprises:

determining inventory status; and, generating an order to purchase consumables.

43. A computer-readable medium having computer-executable instructions for executing the method of:

receiving welding parameters;

searching for welding procedures;

calculating welding costs associated with a welding procedure; and, presenting welding procedure search results and relative welding costs to a user.

44. A computer-readable medium having computer-executable instructions for executing the method of:

communicating information regarding a welding procedure and/or associated consumables to an inventory & distribution system and/or ordering system;

loading the welding procedure into a welding system;

determining whether the welding procedure is qualified;

qualifying and/or approving the welding procedure;

preparing a procedure qualification record;

updating a part documentation with the procedure qualification record;

storing the welding procedure on a local server:

updating the welding system's expert system with the welding procedure; and, updating a remote system's database with the welding procedure.

45. A signal for communicating between a welding system and a remote system, comprising:

a welding system having first welding procedures stored thereon and operatively coupled to a network;

a local server having second welding procedures stored thereon and communicating with the welding system via the network;

at least one remote system having third welding procedures stored thereon;

wherein at least one of the welding system and the local server are operatively coupled to the remote system by the signal and the welding system is adapted to search the stored first welding procedures, the stored second welding procedures, and the third welding procedures stored on the remote system via the signal in response to a user query.

46. A system for managing welding procedures, comprising:

means for receiving welding parameters from a user;

means for searching welding procedures based at least in part upon the welding parameters;

means for calculating relative welding costs associated with a welding procedure;

means for presenting welding procedure results and relative welding costs to a user.

47. A welding system, comprising:

a user interface component adapted to receive at least one weld parameter from a user; and, a searching component adapted to search for at least one welding procedure in response to receiving at least one weld parameter from the user interface component and further adapted to communicate results of the search for the at least one welding procedure to the user interface component wherein the user interface component communicates the results of the search to the user.

48. The welding system of claim 47, further comprising a querying component adapted to extract at least one weld parameter from information received from the user interface component and further adapted to communicate the at least one weld parameter to the searching component.

49. The welding system of claim 47, further comprising a querying component adapted to extract at least one weld parameter from information associated with a welding system and further adapted to communicate the at least one weld parameter to the searching component.

50. The welding system of claim 47, further comprising an aggregating component adapted to receive the results of the search, aggregate the results into a format for presentation to the user via the user interface component.

51. The welding system of claim 47, further comprising a cost determining component adapted to receiving results of the search from the searching component, calculating relative welding costs associated with a welding procedure and communicating the relative welding costs to the user interface component.

52. The welding system of claim 47, further comprising a filtering component for filtering results of the search received from the searching component based at least in part upon information included in inventory and communicating the filtered results of the search to the user interface component.

53. The welding system of claim 47, further comprising a welding procedure creation component adapted to dynamically create a welding procedure based at least in part upon at least one of the at least one weld parameter, information stored on a welding system, information stored on a local area network and information stored on a remote system using at least one of a Bayesian model, a probability tree network, a fuzzy logic model and a neural network.

* * * * *